April 25, 1961  E. W. TAYLOR ET AL  2,981,879
TRANSISTOR-CONTROLLED SPEED-REGULATING SYSTEMS
FOR SERIES COMMUTATOR MOTORS
Filed Jan. 11, 1960
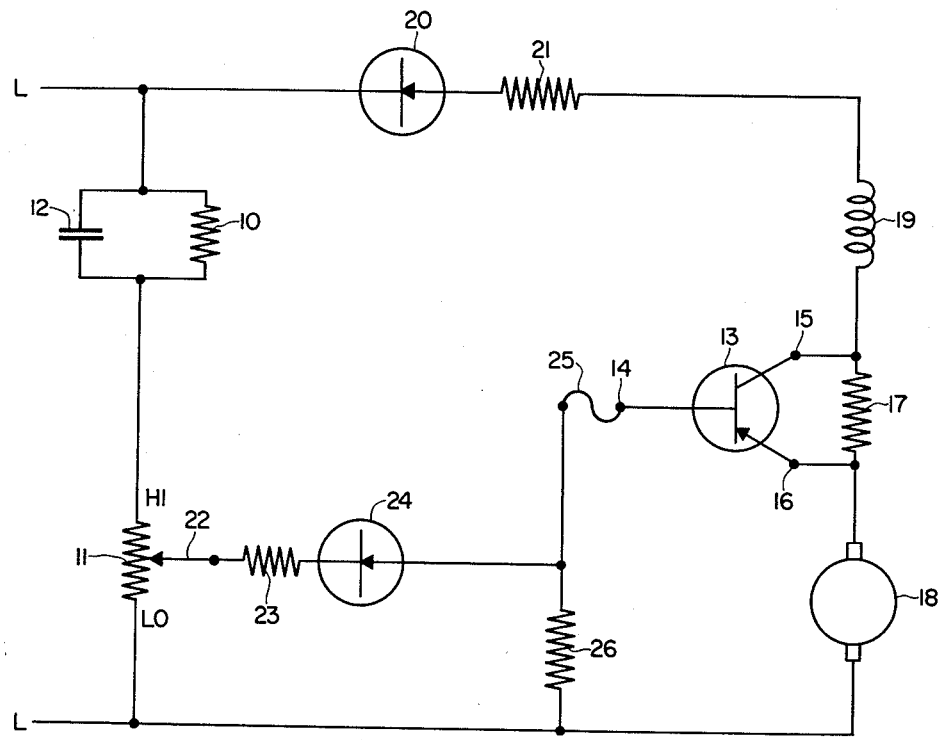
WITNESS
William Martino
BY
INVENTORS
James W. Momberg
Edward W. Taylor
Marshall J. Breen
ATTORNEY

United States Patent Office 2,981,879
Patented Apr. 25, 1961

2,981,879
TRANSISTOR-CONTROLLED SPEED-REGULATING SYSTEMS FOR SERIES COMMUTATOR MOTORS

Edward W. Taylor, Martinsville, and James W. Momberg, Somerville, N.J., assignors to The Singer Manufacturing Company, Elizabeth, N.J., a corporation of New Jersey Filed Jan. 11, 1960, Ser. No. 1,506
5 Claims. (Cl. 318—246)

This invention relates to speed regulating systems for series commutator motors fed from an A.C. voltage source and more particularly to such systems in which transistors are used to provide the regulating function.

Speed regulating systems have heretofore been devised using vacuum tube and gaseous controlled rectifiers but these have, in general, been unsatisfactory due to circuit bulk and complexity derived from heater requirements. Where transistors have been used with line voltage supply, difficulty is encountered due to the presence of damaging voltages making necessary undesirable circuit complexity to protect the transistor itself.

In the present invention these prior art difficulties have been overcome by the use of a transistor in a common emitter configuration in which the emitter to collector terminals are shunted by a resistor of a specified value, which resistor is connected between and in series with the field and armature windings of the motor. This resistor limits the maximum voltage that can be applied to the emitter collector circuit of the transistor to a safe value.

It is an object of this invention to provide a speed regulating system for a commutator motor having series-connected field and armature windings connected to an A.C. voltage source.

It is a further object of this invention to provide a motor speed regulating system fed from regular A.C. line voltage in which a transistor is used as the regulating component and in which inherent protection of the transistor against damaging voltage is provided for.

With the above and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby, will be readily understood by those skilled in the art.

In the drawing the sole figure is a schematic wiring diagram of a circuit embodying the invention.

Referring to the figure, the circuit comprises a fixed resistor 10 in series with a potentiometer resistance 11 across a source L—L of A.C. voltage. A fixed capacitor 12 is in shunt with the fixed resistor 10. A PNP transistor 13 having a base terminal 14, collector terminal 15, and emitter terminal 16 is connected with a fixed resistor 17 across the emitter and collector terminals 16, 15, said resistor 17 being connected between and in series with armature winding 18 and field winding 19, as shown. A series circuit may be traced from one side of the line L—L through a diode rectifier 20, a fusible resistor 21, the field winding 19, the resistor 17, the armature winding 18 to the other side of the line L—L.

A slider 22 for the potentiometer resistance 11 is connected to a resistor 23, thence through a diode 24 and fuse 25, to the base terminal 14 of the transistor 13. A fixed resistor 26 is connected from the junction between the diode 24 and the fuse 25 to one side of the source L—L, as shown.

The diode rectifier 20 half wave rectifies the A.C. input voltage from the source L—L to furnish pulsating D.C. for the series motor windings 18, 19 and the transistor 13. The polarity is such that the collector terminal 15 is negative with respect to the emitter terminal 16. The fusible resistor 21 is used to protect the diode 20 from excess current.

Resistor 17 is selected to have a value such that the motor will just come to a stop when the transistor 13 is cut off. Its main purpose is to limit the voltage between the collector and the emitter to a safe value.

The resistor 26 furnishes a low impedance D.C. return circuit for the diode 24 and it also limits the base to emitter voltage spikes due to commutator sparking. Resistor 23 is used to limit the current to the base terminal 14 and fuse 25 protects this circuit.

The capacitor 12 and resistor 10 provide a time constant for phasing the reference voltage developed across them with respect to the changing phase across the collector-emitter circuit.

The potentiometer resistance 11 with slider 22 adjusts the value of the reference voltage with respect to the feed-back voltage produced by the variable voltage drop across the armature in the emitter circuit.

Operation

When the potentiometer slider 22 is set at the LO end, the transistor is cut off and the only current flowing is through the resistor 17. The value of the resistor was chosen so that the motor would not run with the transistor cut off. Thus, to start the motor, the slider 22 must be advanced until the transistor base bias voltage causes collector to emitter current flow shunting the resistor 17. The speed of the motor depends on the amount of the collector current. The base bias is set so that saturation occurs when the reference voltage is set at maximum, i.e., when the slider 22 is at the HI end of the resistance 11. However the motor torque at any given speed setting depends greatly on the phasing between the reference voltage produced by the resistor-capacitor combination 10, 12 and the motor field and armature voltages at the collector output circuit. The CR value for 10 and 12 is set to produce the greatest torque over a required speed range.

The speed regulation is obtained as follows:

Assume that the slider 22 is set so that the armature is rotating at 1000 r.p.m. and at that speed the emitter voltage (back E.M.F. across the armature) is 10 volts. If the speed should increase due to reduced torque demand, the armature back E.M.F. would increase which decreases the base to emitter voltage and lowers the collector current thus slowing the motor speed to 1000 r.p.m. If on the other hand the speed decreases due to increased torque demand, the armature back E.M.F. would decrease thus increasing the base to emitter voltage and causing more collector current to flow which increases the motor speed to 1000 r.p.m. Thus the transistor 13 functions as a variable gate shunting the resistor 17 with enough current to hold the motor speed substantially constant for reasonable torque variations.

It will be understood that the resistor 17 may be omitted from the circuit if the collector to emitter voltage rating of the transistor is sufficiently high (above 200 volts). Such transistors, if obtainable, would be very expensive. Presently available inexpensive transistors have collector to emitter voltage ratings of 60 to 80 volts and the circuit with the resistor 17 provides adequate protection for their use and will therefore be considered the preferred embodiment.

A practical embodiment of the circuit of this invention has the following components:

| | |
|---|---|
| Diode 20 | 2ON2 diode. |
| Diode 24 | 1N92 diode. |
| Transistor 13 | 2N459 transistor. |
| Resistor 10 | 5600 ohms. |
| Resistor 11 | 10,000 ohm pot. |
| Resistor 17 | 200 ohms. |
| Resistor 21 | 10 ohms (fusible). |
| Resistor 23 | 100 ohms. |
| Resistor 26 | 4700 ohms. |
| Capacitor 12 | 4 mfd. |

Having thus described the nature of our invention, what we claim herein is:

1. A speed regulating system for commutator motors having series-connected armature and field windings fed from an A.C. voltage source, comprising a transistor having base, collector and emitter terminals, a first fixed resistor connected across the collector and emitter terminals, said resistor being connected between and in series with the armature and field windings, a first diode rectifier connected in series with the armature and field windings and the source of A.C. voltage, a second fixed resistor connected in series with a potentiometer resistance across the A.C. voltage source, a capacitor shunted across said second fixed resistor, a slider for said potentiometer resistance and a second diode rectifier connected in series between the slider and the base terminal of the transistor.

2. In a speed regulating circuit for commutator motors having series connected armature and field windings fed from an A.C. voltage source, a transistor having base, collector and emitter terminals, a first circuit in series with the A.C. voltage source comprising a first diode rectifier, the field winding, a fixed resistor and the armature winding, the collector terminal being connected to the junction of the resistor and the field winding, the emitter terminal being connected to the junction of the resistor and the armature winding, a variable resistance voltage divider circuit connected across said A.C. voltage source, a capacitor shunting a portion of said divider circuit, a second diode rectifier connected in series between the output of said divider circuit and the base terminal of the transistor.

3. In a speed regulating circuit for commutator motors having series-connected armature and field windings fed from an A.C. voltage source, a transistor having base, collector and emitter terminals, a variable resistance voltage divider circuit having an adjustable tap connected across said A.C. voltage source, a capacitor shunting a portion of said resistance, a series circuit connected to said A.C. voltage source comprising a first diode rectifier, the field winding, a fixed resistor, and the armature winding, said fixed resistor being connected across the collector and emitter terminals of the transistor, and a second diode rectifier connected in series between the adjustable tap and the base terminal of the transistor.

4. In a speed-regulating circuit for a commutator motor having series-connected armature and field windings fed from an A.C. voltage source, a transistor having base, collector and emitter terminals, a fixed resistor connected across said collector and emitter terminals, a first diode rectifier connected between one side of said source and one side of the field winding, the other side of the field winding being connected to the collector terminal, the armature winding being connected between the other side of said source and the emitter terminal, adjustable voltage divider means connected across the A.C. voltage source for deriving a reference voltage, means including a second diode rectifier connected to said base terminal for applying to said base-emitter terminals a voltage which is the rectified difference between the reference voltage and the back voltage generated by the armature.

5. In a speed-regulating circuit for a commutator motor having series-connected field and armature windings fed from an A.C. voltage source, a transistor having base, collector and emitter terminals, first diode rectifier means connected in series with the A.C. voltage source for supplying D.C. to the motor, a resistor connected across the collector and emitter terminals, said resistor being connected between and in series with the field and armature windings, means including a variable resistance for deriving a speed-setting voltage from said A.C. voltage source, and a second diode rectifier means connected between said variable resistance and the base terminal of the transistor, the base to emitter circuit including the armature winding.

No references cited.